Aug. 24, 1965        J. E. ERIKSSON        3,202,075

AIR CONDITIONING DEVICE FOR VEHICLES WITH AIR-COOLED ENGINES

Filed Jan. 4, 1961

INVENTOR.
John E. Eriksson

BY *C. N. Mortenson*

ATTORNEY

1

3,202,075
AIR CONDITIONING DEVICE FOR VEHICLES
WITH AIR-COOLED ENGINES
John E. Eriksson, Box 1176, Jarbo, Sweden
Filed Jan. 4, 1961, Ser. No. 80,637
3 Claims. (Cl. 98—2)

The present invention is an air-conditioning device for vehicles with air-cooled engines.

On such vehicles it is common practice to utilize the cooling fan of the engine as a propulsion agent, also for air which is to be conducted to the space to be air-cooled, especially the passenger compartment. The systems of this kind previously known have a drawback, however; to wit, the heating of the passenger compartment is unsatisfactory, at least in low temperatures.

The present invention has as its purpose to achieve a simple but effective air-conditioning system by which the passenger compartment can be warmed more quickly and at the same time to achieve and maintain a temperature which is considerably higher than any that has hitherto been possible.

The system developed by the present invention is characterized primarily by the fact that the said space, the passenger compartment, is closely connected with the engine's cold air intake and thus with the cold air fan, by which air is circulated, so that air which has been warmed earlier flows from the passenger compartment back to the cold air intake and then again to the passenger compartment.

By natural leakage between doors and frames and elsewhere in the body, and by supplying cool, fresh air through the cold air intake, the necessary change of air is assured by various means; for example, the change of air can be regulated by opening the windows.

Figure 1:
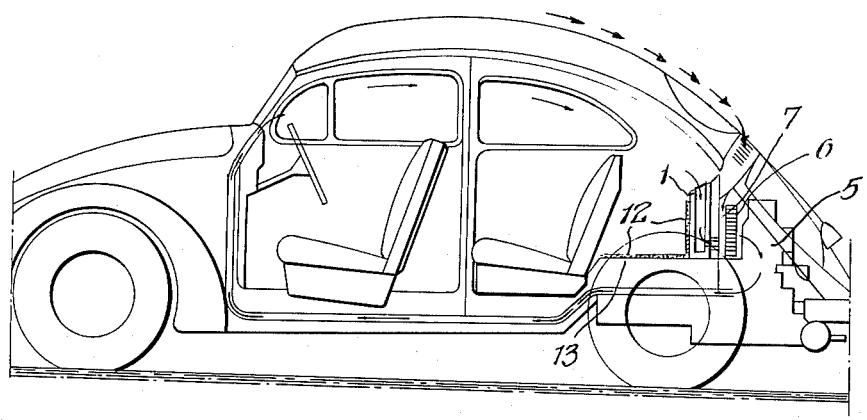
Figure 2:
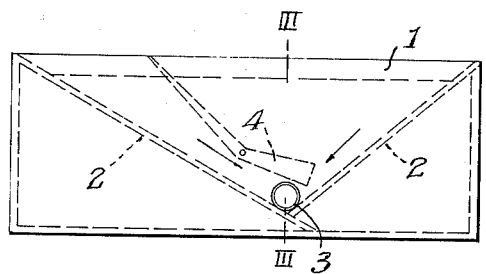
Figure 3:
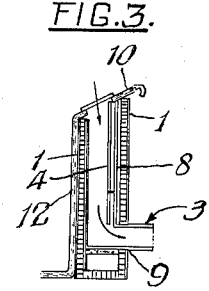
Figure 4:
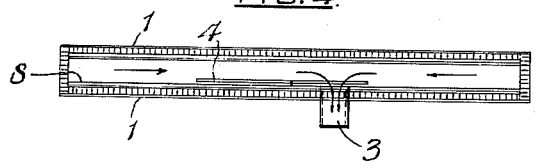

In the attached drawing there is offered an example which illustrates how the present device can be conceived. FIG. 1 shows the side view of a system installed in a car with an air-cooled engine. FIG. 2 shows a detail of FIG. 1 on an enlarged scale, and as seen from the right in FIG. 1. FIG. 3 shows a section from the detail in FIG. 2 on the line III—III in FIG. 2. FIG. 4 shows a view from above in FIG. 2.

The passenger car illustrated in FIG. 1 is a Volkswagen, which has a rear engine 5, which is air-cooled and fitted into the extreme rear of the car. 6 is a schematic drawing of the engine's cold air fan, while 7 indicates the engine's cold air intake. The cold air fan is designed to propel at least a part of the air warmed by the engine into the automobile's passenger compartment.

In accordance with the basic principle upon which this invention rests, the passenger compartment is connected with the cold air intake 7, as well as with the cold air fan 6. By this means complete circulation of cool air is achieved; that is, it returns from the passenger compartment to the cold air intake 7, so that a closed, circular, circulation system is provided.

In the model which is shown the connection between the passenger compartment and the engine's cold air intake is achieved by providing an opening 9, just in front of the cold air intake 7, so that it can effectively admit the returning air from the passenger compartment.

In order, among other things, to improve the transfer of the returning air from the opening 9, to the intake 7, a pipe 3 is inserted in the opening, which extends to a greater or lesser degree towards the intake 7.

In order to reduce the amount of engine noise which might pass to the passenger compartment through the opening 9, at least one plate 1 is placed in front of the opening 9. In the model shown there are two such plates 1, which together constitute a cover, a box, or a chamber, and the plate on the nearest separating wall 8 is pierced by the above-mentioned pipe 3, so that the air from the passenger space passes through the chamber, or cover, between the two plates 1. Since the plates 1 are constructed of, treated with, or covered by some such insulation as felt or fibre material, no disturbing engine noise will be heard in the passenger compartment.

Practical experiments have proved that the noise of the engine is even somewhat less apparent than on cars which are not equipped with a device such as the present invention. These experiments have also shown how this device amazingly improves the heating of the passenger compartment.

It would be advantageous to construct within this chamber at least two angles out of plates or strips 2, which, together with the plates 1 would constitute a kind of hopper, or collection chamber, which would facilitate the passage of air to both the pipe 3, and the opening 9. In the space between the plates 2 a valve 4 could be installed both to regulate and to cut off the stream of air, valve 4 being shown in the open position in FIGURES 2 and 3, it being appreciated that with the downward movement of the wide end of valve 4 about the pivot point the wide end becomes placed in front of pipe 3 thereby closing it, if closure is desired. The route of the circulating air is indicated by the arrows in FIG. 1. The regulation of the air current, and thus also of the amount of heat, can also be effectively achieved by rendering the pipe 3, movable or otherwise adjustable in relation to the intake 7. One can thus regulate the relative proportions of air returning from the passenger compartment and that of the fresh, cool air.

The chamber-like construction created by the plates 2 can be neatly beveled off above so that it will not take up too much space in that area of the automobile where it is installed. It could also well be topped, or covered over, by a mat 12 extending from the hook 10 to the floor 13 in the indicated space.

As shown in FIG. 3, a hook 10, or something similar, can be installed above the plates 1 to make it possible to suspend the chamber from some suitable part of the automobile or vehicle. Finally, it should be pointed out that this invention is not to be thought of as something limited only to the purposes illustrated here, but it is applicable to many other uses within the general framework of the invention's potential.

I claim:

1. A return air inlet device for mounting in a compartment in a vehicle having an engine type heating system for supplying air to said compartment in said vehicle which device comprises an elongated chamber having front, rear and end walls, a closed bottom and an open top forming a return air opening, the rear wall having an outlet opening near its lower edge; mounted in said opening a tubular conduit adapted to extend through a rear wall of a compartment to communicate with a fresh air inlet of an engine heating system; and as a part of said chamber inclined buffer walls extending from said end wall to a point below the said outlet opening.

2. A device in accordance with claim 1 in which at least some of said walls are lined with sound absorbing material.

3. A device in accordance with claim 1 which contains in said chamber a valve in opening and closing relationship with said outlet opening.

References Cited by the Examiner

UNITED STATES PATENTS

| | | | |
|---|---|---|---|
| 797,533 | 8/05 | Phillips | 237—12.3 |
| 1,440,781 | 1/23 | Josephs | 98—2.4 |
| 1,795,101 | 3/31 | Waters | 237—12.3 |
| 2,037,857 | 4/36 | Fox. | |
| 2,151,865 | 3/39 | Nallinger | 98—2.4 |
| 2,430,759 | 11/47 | Crise | 98—2.4 |
| 2,651,986 | 9/53 | Greig | 98—2.4 |
| 2,920,829 | 1/60 | Shane | 98—2.4 |

FOREIGN PATENTS

| | | |
|---|---|---|
| 111,003 | 11/17 | Great Britain. |
| 1,076,659 | 4/54 | France. |

ROBERT A. O'LEARY, *Primary Examiner.*

BENJAMIN BENDETT, *Examiner.*